(12) United States Patent
Raikar et al.

(10) Patent No.: US 12,734,995 B2
(45) Date of Patent: Sep. 15, 2026

(54) SYSTEM AND METHOD FOR DETECTING INTERNAL CARGO LOSS USING SENSOR DATA

(71) Applicant: Torc Robotics, Inc., Blacksburg, VA (US)

(72) Inventors: Akshay Pai Raikar, Blacksburg, VA (US); William Davis, Blacksburg, VA (US); Armenio Rivero, Blacksburg, VA (US); Pablo Smith, Blacksburg, VA (US); Joseph R. Fox-Rabinovitz, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 253 days.

(21) Appl. No.: 18/595,607

(22) Filed: Mar. 5, 2024

(65) Prior Publication Data

US 2025/0282324 A1 Sep. 11, 2025

(51) Int. Cl.
*B60R 25/34* (2013.01)
*G01V 8/10* (2006.01)

(52) U.S. Cl.
CPC ................ *B60R 25/34* (2013.01); *G01V 8/10* (2013.01)

(58) Field of Classification Search
CPC ........... B60R 25/34; G01V 8/10; G01V 11/00
See application file for complete search history.

(56) References Cited

U.S. PATENT DOCUMENTS

| | | | | |
|---|---|---|---|---|
| 9,354,617 | B2 * | 5/2016 | Jain | G08G 1/07 |
| 9,958,872 | B2 | 5/2018 | Anderson | |
| 10,311,315 | B2 | 6/2019 | Drazan | |
| 11,580,484 | B2 | 2/2023 | Patnaik | |
| 2006/0202809 | A1 * | 9/2006 | Lane | G06Q 10/08 340/438 |
| 2016/0050356 | A1 * | 2/2016 | Nalepka | H04N 7/181 348/148 |

OTHER PUBLICATIONS https://www.amazon.com/s?k=garage+door+sensor&ref=cs_503_search Accessed Jan. 9, 24.

https://www.amazon.com/s?k=restaurant+pager&crid=HM2L1EBUHHT7&sprefix=restaurant+pager%2Caps% 2C380&ref=nb_sb_noss_1 Accessed Jan. 9, 24.

https://konnected.io/products/contact-sensor-recessed- magnetic-for-doors-or-windows Accessed Jan. 9, 24.

* cited by examiner

*Primary Examiner* — Daryl C Pope

(74) *Attorney, Agent, or Firm* — McCarter & English, LLP

(57) ABSTRACT

A system for detecting and reporting cargo lost from a vehicle is disclosed. The system includes a plurality of sensors, and a cargo loss detection system including a processor and a memory device storing instructions that when executed by the processor configure the processor to: (i) receive, from the plurality of sensors, sensor data representing a plurality of cargo loss-related conditions; (ii) determine a cargo loss event has occurred based on a combination of more than one cargo loss-related conditions of the plurality of cargo loss-related conditions; and (iii) transmit a lost cargo detection signal to an external receiver.

20 Claims, 5 Drawing Sheets

SYSTEM AND METHOD FOR DETECTING INTERNAL CARGO LOSS USING SENSOR DATA

TECHNICAL FIELD

The field of the disclosure relates generally to autonomous vehicles and, more specifically, to systems and methods for detecting internal cargo loss of the autonomous vehicle using sensor data.

BACKGROUND

At least some known autonomous vehicles may implement four fundamental technologies in their autonomy software system: perception, localization, behaviors and planning, and motion control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies may process features in the sensed environment to correlate, or register, those features to known features on a map. Additionally, localization technologies may use data received from sensors or various odometry information sources to generate an estimated vehicle location in the world.

Behaviors and planning technologies determine how to move through the sensed environment to reach a planned destination, processing data representing the sensed environment and localization or mapping data to plan maneuvers and routes to reach the planned destination. Motion control technologies translate the output of behaviors and planning technologies into concrete commands to the vehicle via the vehicle interface provided by the internal electronic control unit (ECU).

One element of perception for autonomous vehicles is detection and identification of conditions within or surrounding the autonomous vehicle. During operation, a condition may be detected by the autonomous vehicle that may make further operation of the autonomous vehicle unsafe. For example, a cargo loss-related condition may be detected within the autonomous vehicle or in an area surrounding the autonomous vehicle, such as proximate a trailer of the vehicle, to indicate cargo may have been lost from the trailer of the vehicle. Such cargo loss may occur while loading or unloading the trailer at the fleet hub, due to a malicious action by someone when the truck is pulled over, or during transit due to improperly secured trailer doors. However, without detecting these conditions, the autonomous vehicle may be unable to safely continue movement towards a planned destination. Accordingly, there exists a need for systems and methods for detecting and reporting cargo lost from an autonomous vehicle using sensor data.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, a system for detecting and reporting cargo lost from a vehicle is disclosed. The system includes a plurality of sensors, and a cargo loss detection system including a processor and a memory device storing instructions that when executed by the processor configure the processor to: (i) receive, from the plurality of sensors, sensor data representing a plurality of cargo loss-related conditions; (ii) determine a cargo loss event has occurred based on a combination of more than one cargo loss-related conditions of the plurality of cargo loss-related conditions; and (iii) transmit a lost cargo detection signal to an external receiver.

In another aspect, a method of detecting and reporting cargo lost from a vehicle including a trailer is disclosed. The method includes (i) receiving, from a plurality of sensors, sensor data representing a plurality of cargo loss-related conditions; (ii) determining a cargo loss event has occurred based on a combination of more than one cargo loss-related conditions of the plurality of cargo loss-related conditions; and (iii) transmitting a lost cargo detection signal to an external receiver.

In yet another aspect, a vehicle including a tractor, a trailer connectable to the tractor, a plurality of sensors, a processor, and a memory device storing instructions is disclosed. The instructions, when executed by the processor, configure the processor to: (i) receive, from the plurality of sensors, sensor data representing a plurality of cargo loss-related conditions; (ii) determine a cargo loss event has occurred based on a combination of more than one cargo loss-related conditions of the plurality of cargo loss-related conditions; and (iii) transmit a lost cargo detection signal to an external receiver.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
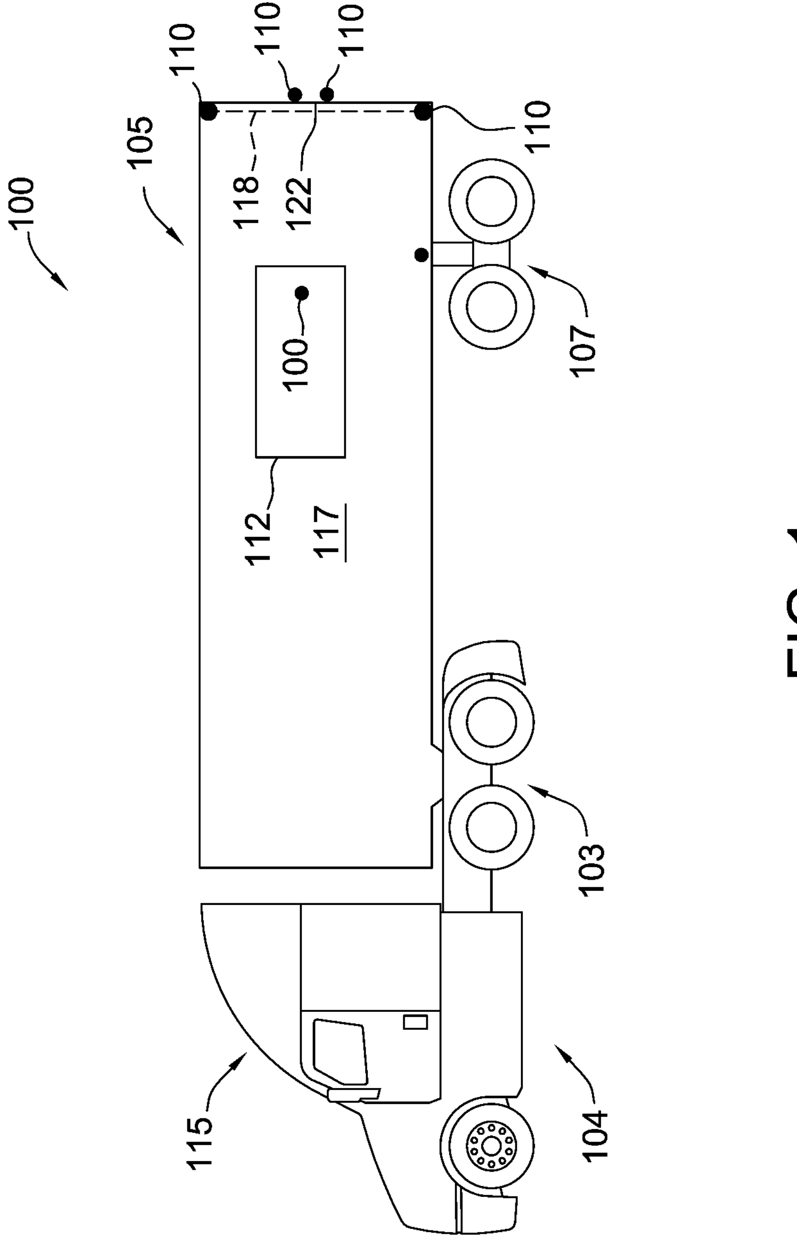
FIG. 1 is a side view of a vehicle including an embodiment of a cargo loss detection system.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, or steering wheel positioning, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane or parking the vehicle without human intervention. A semi-autonomous vehicle has an autonomy level of level-1, level-2, or level-3 recognized by NHTSA. The semi-autonomous vehicle requires a human driver at all times for operating the semi-autonomous vehicle.

A non-autonomous vehicle: A non-autonomous vehicle is a vehicle that is driven by a human driver. A non-autonomous vehicle is neither an autonomous vehicle nor a semi-autonomous vehicle. A non-autonomous vehicle has an autonomy level of level-0 recognized by NHTSA.

Mission control: Mission control, also referenced herein as a centralized or regionalized control, is a hub in communication with one or more autonomous vehicles of a fleet. Database or datastore at mission control may store data received from the autonomous vehicles. Mission control may analyze the stored data and identify information associated with cargo loss events, and issue notifications to others.

As described in the present disclosure, often times cargo loss may occur while loading or unloading the trailer at the fleet hub, due to a malicious action by someone when the truck is pulled over, or during transit due to improperly secured trailer doors. Even when the truck is operated by a human driver, it may be difficult for the driver to detect that the cargo is lost or removed from the trailer. Accordingly, embodiments described herein may be used for detecting a cargo loss event for an autonomous vehicle, a semi-autonomous vehicle, and a non-autonomous vehicle.

In some embodiments, a cargo loss event may be detected using one or more sensors mounted on the rear of the trailer, or on the cargo. Based upon sensor data of the one or more sensors, various stages of cargo loss from the trailer of the autonomous vehicle may be detected. The one or more sensors may include infrared sensors, active or passive magnetic sensors, electrical contact sensors, light sensors, cameras, or location sensors. By way of a non-limiting example, one or more infrared sensors may be used for detecting that a cargo has moved past the trailer doors. As the cargo moves past the trailer doors, the moving cargo may temporarily, but for non-trivial amount of time, block or interrupt the infrared sensor(s) positioned near the trailer doors. The infrared sensor(s) blocked or interrupted by the moving cargo may generate a sensor data event reporting this blocking. Another sensor data event may be generated when the infrared sensor(s) is unblocked or uninterrupted. Accordingly, one or more infrared sensors may be used to detect when the cargo moves across a particular boundary line.

In some embodiments, active or passive magnetic sensors, electrical contact sensors, light sensors, or cameras may be used to detect whether the trailer doors are open or close. A magnetic sensor or an electrical contact sensor attached to each trailer door may form a closed circuit when the trailer doors are closed. Opening of the trailer doors may break the closed circuit causing a sensor data event being generated that indicates the trailer doors are open. Similarly, a light sensor may be used to detect light inside the trailer that may be present when the trailer doors are open. Additionally, cameras may be used to detect a change in the captured image caused by opening of the trailer doors.

In some embodiments, a location sensor may be attached to a cargo placed near the trailer door that is most likely going to be the first to be lost when the trailer doors get opened while the truck is still moving. A beacon positioned inside the trailer may receive location data from the location sensor. As long as the beacon is receiving location data from the location sensor, the cargo may be considered within the trailer's cargo area. When the beacon stops receiving location data from the location sensor, the cargo may be considered being lost or outside the trailer's cargo area and a corresponding sensor data event may be generated. Additionally, or alternatively, a proximity sensor may be used to detect when the cargo placed in the trailer's cargo area near the trailer doors is moved out of the trailer. By way of a non-limiting example, the proximity sensor may be a Bluetooth Low Energy (BLE) proximity sensor.

While the one or more sensors installed in the trailer or on the cargo, as described herein, may generate sensor data representing one or more cargo loss-related conditions, the sensor data may be analyzed by a cargo loss detection system installed in the vehicle (or by the mission control agent including an artificial intelligence agent) to identify or determine a cargo loss event has occurred. Upon determining that the cargo loss event has occurred, a lost cargo detection signal may be generated. The lost cargo detection signal may include a current geolocation of the vehicle.

For example, when a sensor data event is generated corresponding to a cargo moving across a particular boundary line by one or more infrared sensors, but if no sensor data event is generated corresponding to the trailer doors being opened, the sensor data event corresponding to the cargo moving across a particular boundary line may be ignored. Accordingly, sensors data events from the one or more sensors installed inside the trailer cargo area and on the cargo may need to occur in a specific sequence for detecting cargo loss events. Two different scenarios of cargo loss and their corresponding specific sequence of sensor data events are described in detail in the present disclosure and illustrated in FIG. 3A and FIG. 3B. Additionally, current geolocation of the truck to which the trailer is attached may also be reported to the mission control. The mission control may use the current geolocation data to report to law enforcement, or other vehicles or drivers in proximity of the geolocation of the truck where the cargo loss occurred. Blocking or interrupting one or more infrared sensors by a cargo, open or closed trailer doors, detected proximity, and presence or absence of a cargo are various cargo loss-related conditions that can be detected, as described herein, using sensor data.

As described herein, the embodiments are described with regards to the autonomous vehicle may also be applicable to a non-autonomous vehicle or a semi-autonomous vehicle. Various features or embodiments described above are discussed in more detail below with respect to FIGS. 1-4.

FIG. 1 is a side view of a vehicle 100. The vehicle 100 is configured for autonomous operation via an autonomy system 102 (shown in FIG. 2). The vehicle 100 includes a trailer 105, a tractor 115 connectable to the trailer 105, a front wheel set 103 to support the tractor 115, and a back wheel set 107 to support the trailer 105. The vehicle 100 also includes a cargo loss detection system 104 for perceiving conditions within or surrounding the vehicle 100, including, but not limited to, cargo loss-related conditions or cargo loss-indicative conditions. The autonomy system 102 may be used to control the vehicle 100 based on the cargo loss-related conditions or the cargo loss-indicative conditions, such as to control movement of the vehicle 100, plan movement of the vehicle 100, or transmit a lost cargo detection signal to an external receiver, e.g., to mission control.

The cargo loss detection system 104 includes a plurality of sensors 110 to detect cargo loss-related conditions within or in an area surrounding the vehicle 100, such as, but not limited to, a longitudinal movement of an object (or a cargo), an object detection threshold, open or close trailer doors, proximity or presence of an object, and a light amount. The plurality of sensors 110 may be any sensor known in the art that facilitates the collection of data as related to the cargo loss detection system 104. For example, the plurality of sensors 110 may include, but are not limited to, cameras, active or passive magnetic sensors, electrical contact sensors, infrared sensors, proximity or presence detection sensors, location sensors, or light sensors.

The plurality of sensors 110 including active or passive magnetic sensors or electrical contact sensors may be positioned on the trailer doors to detect when the trailer doors are opened or closed. The plurality of sensors 110, including infrared sensors, may be positioned inside the trailer cargo area 117 near the trailer doors to detect when the cargo crosses a particular boundary line 118. The plurality of sensors 110 including proximity or presence detection sensors, or location sensors, may be placed on the cargo 112 that is closest to the trailer doors and the most likely to move out first when the trailer doors get opened while the vehicle 100 is moving or needs to be moved first to remove other cargo from the trailer cargo area. The positioning of the sensors 110 in FIG. 1 is intended to be illustrative and is therefore not meant to be limiting.

The plurality of sensors 110 may be oriented proximate a back trailer end 122 of the trailer 105 to detect cargo loss-related conditions, such as an opening of one or more doors of the trailer 105 or objects detected behind the vehicle 100. Additionally, for example, the plurality of sensors 110 may be positioned on or proximate to the back trailer end 122 of the trailer 105 and oriented outwards from the back trailer end 122 to collect signal data exterior to the vehicle 100, such as, but not limited to, behind the vehicle 100.

Figure 2:
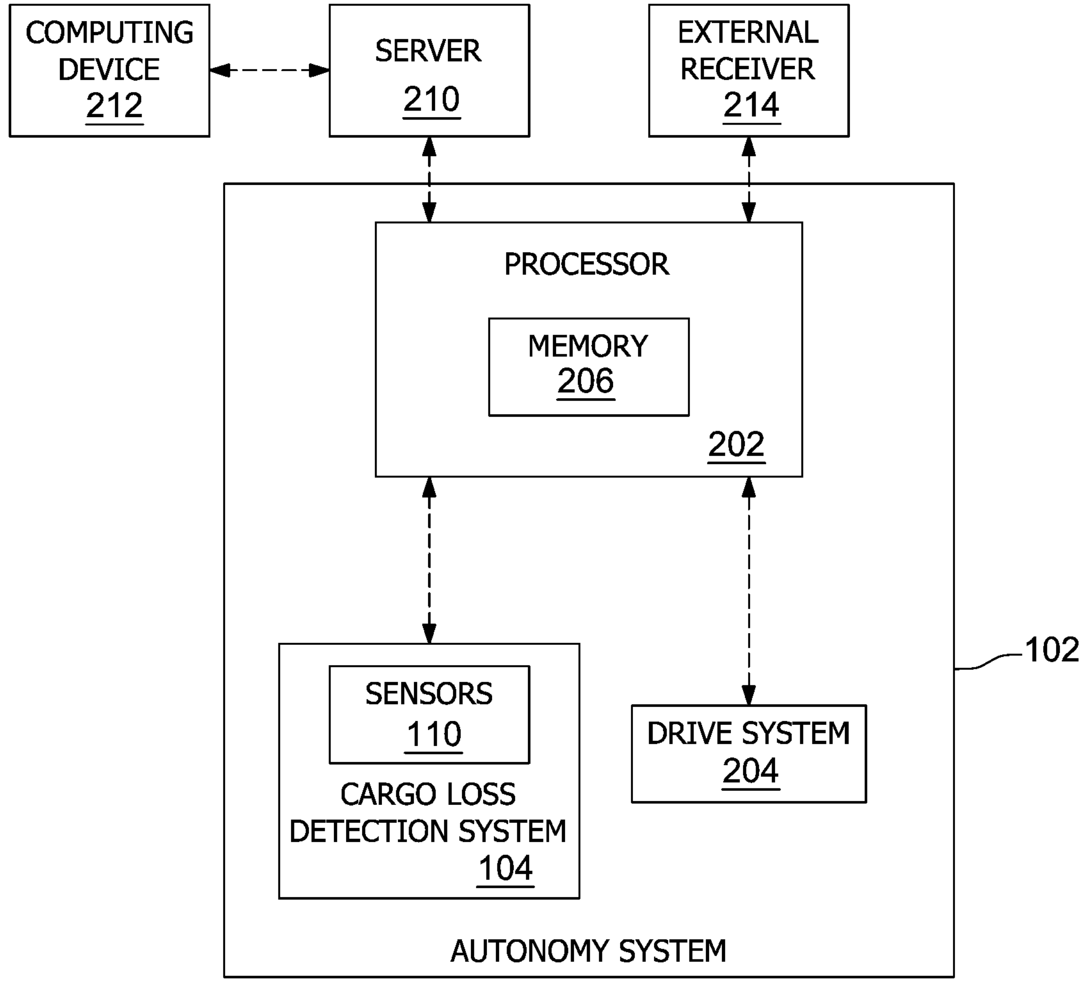
FIG. 2 is a schematic of an autonomy system for use with a vehicle including a cargo loss detection system.

FIG. 2 is a schematic of the autonomy system 102 for use with the vehicle 100. The autonomy system 102 may be used with any embodiment of the cargo loss detection system 104 as described herein. The autonomy system 102 includes a processor 202 in communication with the cargo loss detection system 104. The processor 202 may also be in communication with a drive system 204 to autonomously control movement of the vehicle 100. The processor 202 may be one or more processing systems. The processor 202 includes a memory 206. The memory 206 may be any device allowing information such as executable instructions or data to be stored and retrieved. The processor 202 may include one or more processing units to retrieve and execute instructions or data stored by the memory 206. Alternatively, the processor 202 may be coupled with the memory 206, which is not included in the processor 202 or may be independent of the processor 202.

The autonomy system 102 may use signals received from the plurality of sensors 110 of the cargo loss detection system 104 to control the drive system 204. Additionally, the autonomy system 102 may use signals received from a server 210 or transmit signals received from the plurality of sensors 110 to the server 210. The server 210 may be in communication with a computing device 212, such as, but not limited to, a user computing device of a mission control agent, an artificial intelligence agent, or another vehicle in communication with the vehicle 100 to send or receive signals between vehicles.

The autonomy system 102 may control the generation and transmission of a lost cargo detection signal based on the one or more cargo loss-related conditions identified within or surrounding the vehicle 100. For example, the generation and transmission of the lost cargo detection signal may signify the occurrence of a cargo loss event and may be based on a variable relationship as determined by the processor 202 based on a sequence of sensor data events for different cargo loss scenarios discussed with regard to FIG. 3A and FIG. 3B.

Figure 3A:
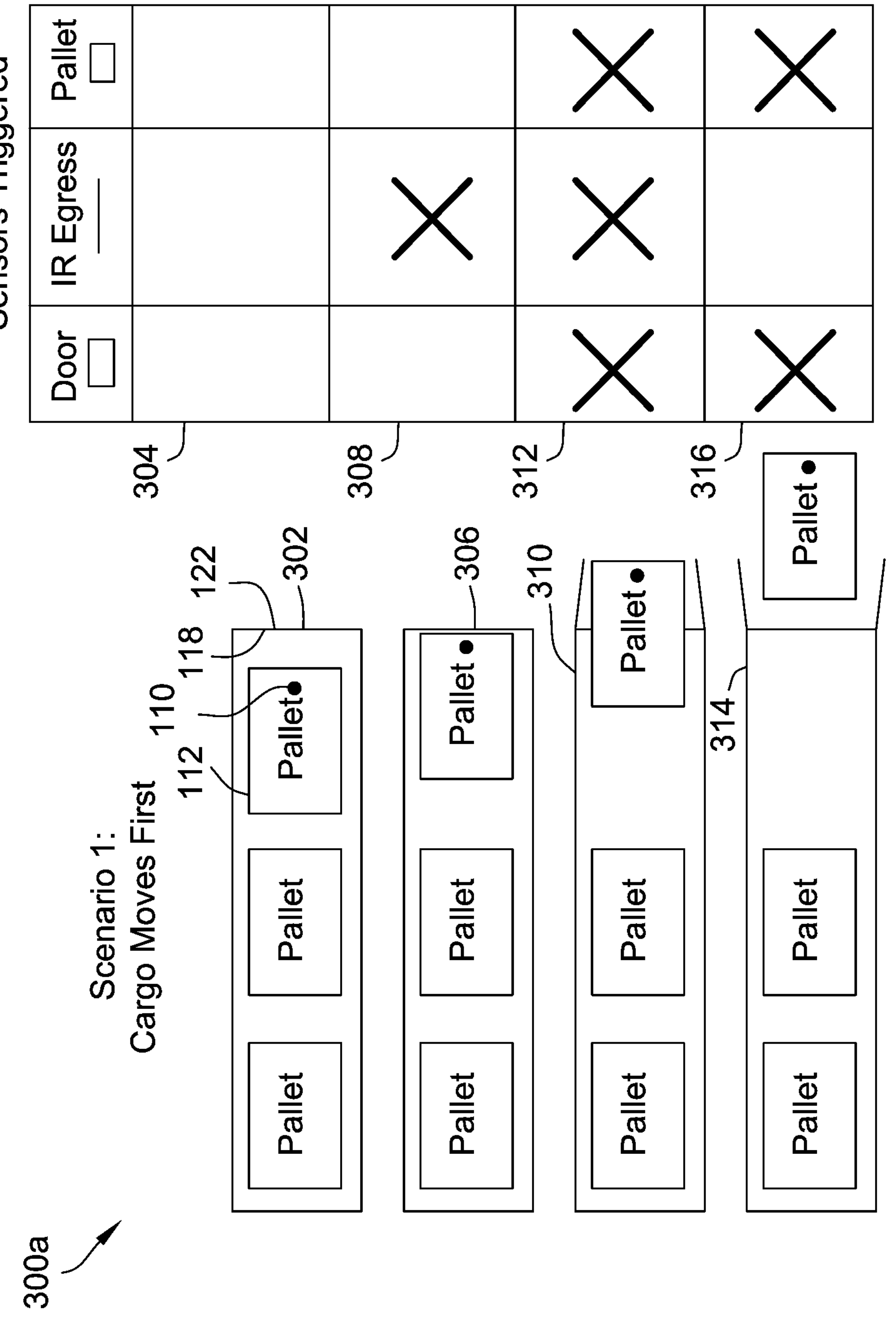
FIG. 3A is an example of a series of sensor data events for a scenario of cargo loss.

FIG. 3A is an example 300*a* of series of sensor data events for a scenario of cargo loss. As shown in FIG. 3A as sensor states 304, while the cargo 112 is inside the trailer cargo area 117 and trailer doors are locked, as shown in FIG. 3A as cargo states 302, no sensor data event is being generated by one or more sensors (shown in FIG. 1) positioned on the trailer doors for detecting open or closed trailer doors. Further, since the cargo 112 has not moved longitudinally within the trailer cargo area 117 blocking or interrupting one or more infrared sensors positioned inside the trailer cargo area proximate to the trailer doors, no sensor data event is generated by the one or more infrared sensors indicating that the cargo has crossed a particular boundary line blocking or interrupting the one or more infrared sensors. Further, a proximity or presence detection sensor, or a location sensor, placed on the cargo most proximate to the trailer doors inside the trailer cargo area 117 may not cause any sensor data event identifying that the cargo is not within proximity of a beacon installed within the trailer cargo area while the trailer doors are locked and the cargo is present inside the trailer cargo area.

As the cargo longitudinally moves inside the trailer cargo area, as shown in FIG. 3A as sensor states 308, the cargo may block or interrupt the one or more infrared sensors positioned inside the trailer cargo area proximate to the trailer doors. Accordingly, as shown in FIG. 3A as cargo states 306, a sensor data event may be generated by the one or more infrared sensors indicating the cargo has crossed a particular boundary line. However, since the cargo is still within the trailer cargo area and the trailer doors are locked, no other sensor data event is generated. In other words, when only the one or more infrared sensors reports a particular sensor data event corresponding to the blocked or interrupted infrared sensors, no further action may be required by the mission control agent.

However, if the cargo continues to move such that the trailer doors get opened, as shown in FIG. 3A as sensor states 312, and the cargo is further out (and likely hanging outside of the trailer cargo area), sensor data events may also be generated by one or more sensors positioned on the trailer doors indicating the trailer doors are open in addition to the proximity or presence detection sensor, or the location sensor, placed on the cargo indicating that the cargo is outside of a range of the beacon receiving signals from the proximity or presence detection sensor, or the location sensor, as shown in FIG. 3A as cargo states 310. Further, as the cargo gets completely out of the trailer cargo area unblocking or not interrupting the one or more infrared sensors, as shown in FIG. 3A as sensor states 316, sensor data events, as shown in FIG. 3A as cargo states 314, are received by the mission control. The mission control agent may notify law enforcement, or other people or vehicles in proximity of a geolocation of the truck attached to the trailer, about the detected cargo loss event when the sensor data events shown in FIG. 3A as 310 or 314 occur. Additionally, or alternatively, the mission control agent may cause the vehicle to pull over, slow down, or enter into a reduced functionality mode.

Figure 3B:
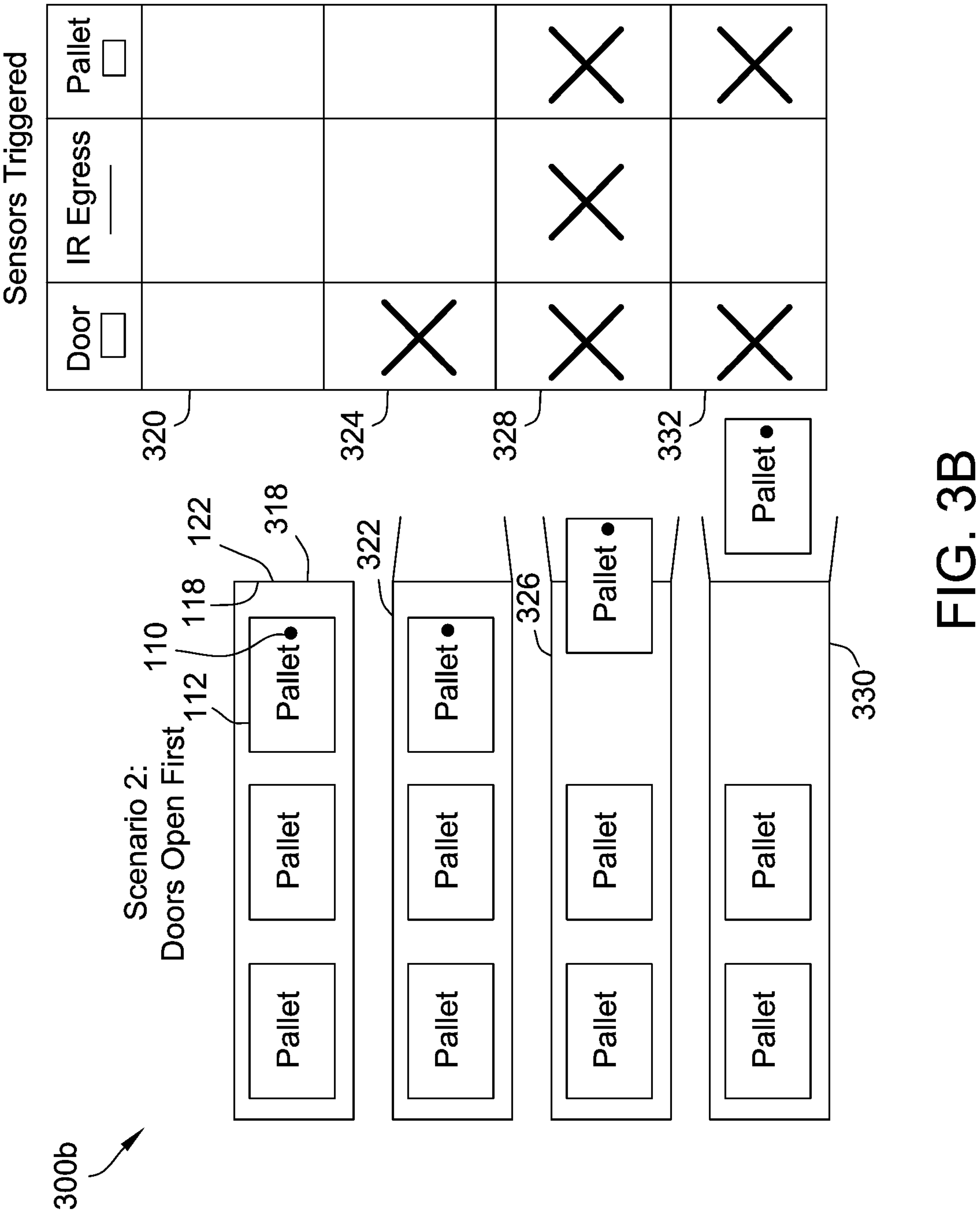
FIG. 3B is another example of a series of sensor data events for another scenario of cargo loss.

FIG. 3B is another example 300*b* of series of sensor data events for a scenario of cargo loss. As shown in FIG. 3B as sensor states 320, while the cargo is inside the trailer cargo area and trailer doors are locked, as shown in FIG. 3A as cargo states 318, no sensor data event is being generated by one or more sensors positioned on the trailer doors for detecting open or closed trailer doors. Further, since the cargo has not moved longitudinally within the trailer cargo area blocking or interrupting one or more infrared sensors positioned inside the trailer cargo area proximate to the trailer doors, no sensor data event is generated by the one or more infrared sensors indicating that the cargo has crossed a particular boundary line blocking or interrupting the one or more infrared sensors. Further, a proximity or presence detection sensor, or a location sensor, placed on the cargo most proximate to the trailer doors inside the trailer cargo area may not cause any sensor data event identifying that the cargo is not within proximity of a beacon installed within the trailer cargo area while the trailer doors are locked and the cargo is present inside the trailer cargo area.

As the trailer doors get open, as shown in FIG. 3B as sensor states 324, a sensor data event may be generated by the one or more sensors positioned on the trailer doors indicating the trailer doors are open, which is shown in FIG. 3B as cargo states 322. However, since the cargo is still within the trailer cargo area and the cargo has not moved a particular boundary line blocking or interrupting the one or more infrared sensors, no other sensor data event is generated.

However, if the cargo longitudinally moves, as shown in FIG. 3B as sensor states 328 and sensor states 332, the cargo may block or interrupt the one or more infrared sensors positioned inside the trailer cargo area proximate to the trailer doors. Accordingly, as shown in FIG. 3B as cargo states 326 and cargo states 330, a sensor data event may be generated by the one or more infrared sensors indicating the cargo has crossed a particular boundary line. Additionally, since the cargo is further out (and while blocking the one or more infrared sensors), a sensor data event is also generated by the proximity or presence detection sensor, or the location sensor, placed on the cargo indicating that the cargo is outside of a range of the beacon receiving signals from the proximity or presence detection sensor, or the location sensor, as shown in FIG. 3B as cargo states 326 and as cargo states 330. The mission control agent may notify the law enforcement, or other people or vehicles in proximity of a geolocation of the truck attached to the trailer, about the detected cargo loss event when the sensor data events shown in FIG. 3B as sensor states 324, sensor states 328 or sensor states 332 occur. Additionally, or alternatively, the mission control agent may cause the vehicle to pull over, slow down, or enter into a reduced functionality mode.

Figure 4:
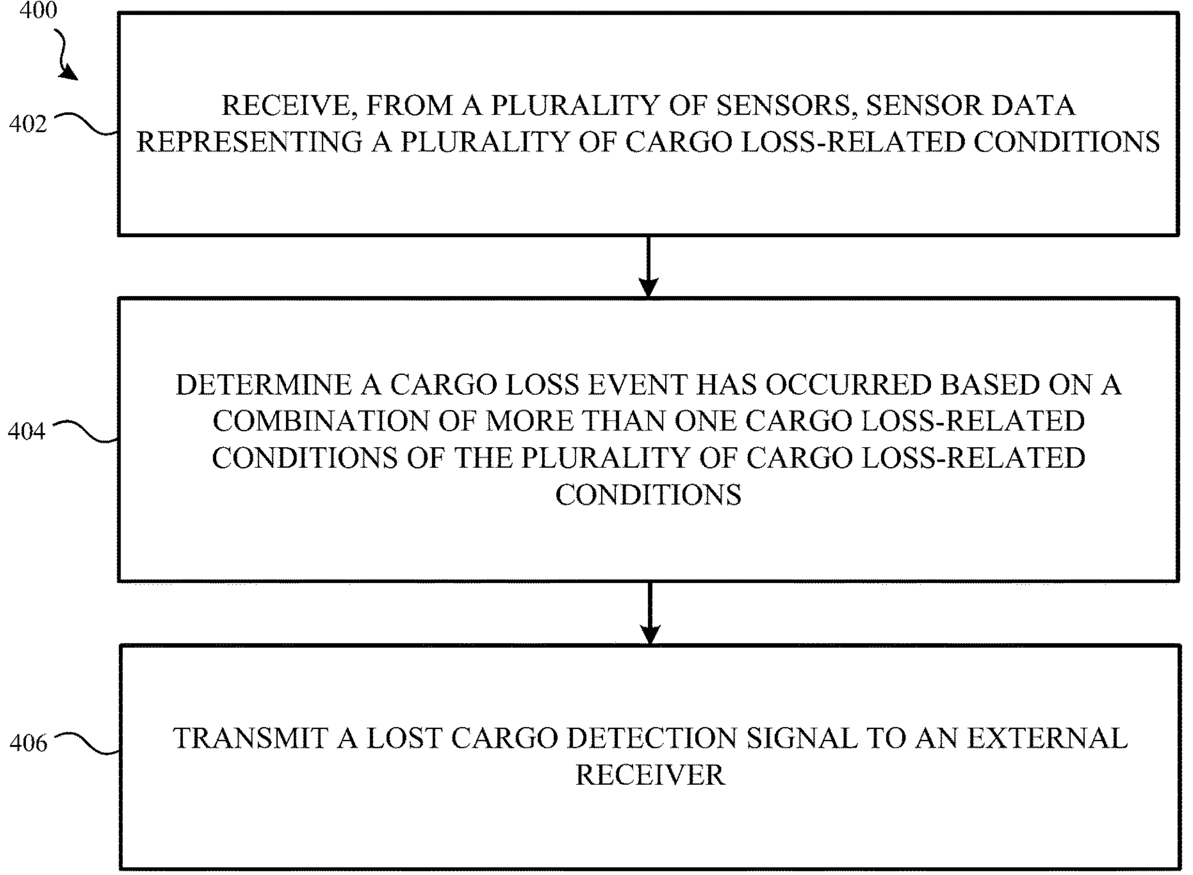
FIG. 4 is an exemplary flow chart of method operations of detecting and reporting a cargo loss event for a vehicle in accordance with embodiments of the present disclosure.

FIG. 4 is an exemplary flow chart 400 of an embodiment method of detecting and reporting a cargo loss event for a vehicle including a tractor and a trailer connectable to the tractor. The method includes receiving 402 sensor data from a plurality of sensors, wherein the sensor data may represent a plurality of cargo loss-related conditions. The plurality of sensors may include one or more magnetic sensors, one or more electrical contact sensors, one or more infrared sensors, one or more cameras, one or more proximity sensors, one or more presence detection sensors, one or more location sensors, or one or more light sensors. The trailed may include at least one trailer door, and the trailer may be oriented longitudinally front to back. The cargo loss-related conditions may include longitudinal movement of a cargo inside the trailer, an open trailer door, or absence of the cargo. The longitudinal movement of the cargo inside the trailer may be detected using one or more infrared sensors positioned proximate to the at least one trailer door. An open trailer door may be detected using one or more electrical contact sensors, or one or more magnetic sensors, positioned on the at least one trailer door. The absence of the cargo may be detected using one or more proximity sensors, one or more presence detection sensors, or one or more location sensors, positioned on the cargo that is nearest to the at least one trailer door.

The method includes determining 404 a cargo loss event has occurred based on a combination of more than one cargo loss-related conditions of the plurality of cargo loss-related conditions. By way of a non-limiting example, the cargo loss event has occurred may be determined 404 based on the combination including an open trailer door and absence of the cargo or based on the combination including an open trailer door and longitudinal movement of a cargo inside the trailer. Additionally, or alternatively, the cargo loss event has occurred may be determined 404 based on a sequence of cargo loss-related conditions including an open trailer door followed by longitudinal movement of a cargo inside the trailer or based on a sequence of cargo loss-related conditions including longitudinal movement of a cargo inside the trailer followed by an open trailer door. The method also includes transmitting 406 a lost cargo detection signal to an external receiver, e.g., mission control, as described herein.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system for detecting and reporting cargo lost from a vehicle, the system comprising:
- a plurality of sensors; and
- a cargo loss detection system comprising a processor and a memory device, the memory device storing instructions that when executed by the processor configure the processor to:
  - receive, from the plurality of sensors, sensor data representing a plurality of cargo loss-related conditions;
  - determine a cargo loss event has occurred based on a combination of two or more cargo loss-related conditions of the plurality of cargo loss-related conditions, wherein one of the two or more cargo loss-related conditions includes movement of a cargo across a boundary line inside the vehicle; and
  - transmit a lost cargo detection signal to an external receiver,
  - wherein determining the cargo loss event has occurred is based on a sequence of the two or more cargo loss-related conditions.

2. The system of claim 1, wherein the plurality of sensors includes one or more magnetic sensors, one or more electrical contact sensors, one or more infrared sensors, one or more cameras, one or more proximity sensors, one or more presence detection sensors, one or more location sensors, or one or more light sensors.

3. The system of claim 1, wherein the vehicle includes a trailer having at least one trailer door and oriented longitudinally front to back, and wherein the plurality of cargo-loss related conditions includes longitudinal movement of the cargo inside the trailer, an open trailer door, or absence of the cargo.

4. The system of claim 3, wherein the longitudinal movement of the cargo inside the trailer is detected using one or more infrared sensors.

5. The system of claim 4, wherein the one or more infrared sensors are positioned proximate to the at least one trailer door.

6. The system of claim 3, wherein the open trailer door is detected using one or more electrical contact sensors, or one or more magnetic sensors.

7. The system of claim 6, wherein the one or more magnetic sensors or the one or more electrical contact sensors are positioned on the at least one trailer door.

8. The system of claim 3, wherein the absence of the cargo is detected using one or more proximity sensors, one or more presence detection sensors, or one or more location sensors.

9. The system of claim 8, wherein the one or more proximity sensors, the one or more presence detection sensors, or the one or more location sensors are positioned on the cargo that is nearest to the at least one trailer door.

10. The system of claim 1, wherein the vehicle includes a trailer having at least one trailer door and oriented longitudinally front to back, and wherein determining the cargo loss event has occurred is based on the combination including an open trailer door and absence of the cargo.

11. The system of claim 1, wherein the vehicle includes a trailer having at least one trailer door and oriented longitudinally front to back, and wherein determining the cargo loss event has occurred is based on a sequence of cargo loss-related conditions including an open trailer door followed by longitudinal movement of the cargo inside the trailer.

12. The system of claim 1, wherein the vehicle includes a trailer having at least one trailer door and oriented longitudinally front to back, and wherein determining the cargo loss event has occurred is based on a sequence including longitudinal movement of the cargo inside the trailer followed by an open trailer door.

13. The system of claim 1, wherein the vehicle includes a trailer having at least one trailer door and oriented longitudinally front to back, and wherein determining the cargo loss event has occurred is based on the combination including an open trailer door and the longitudinal movement of the cargo inside the trailer.

14. A method of detecting and reporting cargo lost from a vehicle including a trailer, the method comprising:
- receiving, from a plurality of sensors, sensor data representing a plurality of cargo loss-related conditions;
- determining a cargo loss event has occurred based on a combination of two or more cargo loss-related conditions of the plurality of cargo loss-related conditions, wherein one of the two or more cargo loss-related conditions includes movement of a cargo across a boundary line inside the trailer; and
- transmitting a lost cargo detection signal to an external receiver,
- wherein determining the cargo loss event has occurred is based on a sequence of the two or more cargo loss-related conditions.

15. The method of claim 14, wherein:
- the plurality of sensors includes one or more infrared sensors positioned proximate to at least one trailer door;
- the plurality of cargo-loss related conditions includes longitudinal movement of a cargo inside the trailer; and
- determining the cargo loss event has occurred includes detecting the longitudinal movement of the cargo inside the trailer using the one or more infrared sensors.

16. The method of claim 14, wherein:
- the plurality of sensors includes one or more magnetic sensors or one or more electrical contact sensors positioned on at least one trailer door;
- the plurality of cargo-loss related conditions includes an open trailer door; and
- determining the cargo loss event has occurred includes detecting the at least one trailer door is the open trailer door using the one or more electrical contact sensors or one or more magnetic sensors.

17. The method of claim 14, wherein determining the cargo loss event has occurred is based on the combination including an open trailer door and absence of the cargo, or an open trailer door and longitudinal movement of the cargo inside the trailer.

18. The method of claim 14, wherein determining the cargo loss event has occurred is based on a sequence including an open trailer door followed by longitudinal movement of the cargo inside the trailer, or a sequence including longitudinal movement of the cargo inside the trailer followed by an open trailer door.

19. A vehicle comprising:
- a tractor;
- a trailer connectable to the tractor;
- a plurality of sensors;
- a processor; and
- a memory device storing instructions that, when executed by the processor, configure the processor to:
  - receive, from the plurality of sensors, sensor data representing a plurality of cargo loss-related conditions;
  - determine a cargo loss event has occurred based on a combination of two or more cargo loss-related conditions of the plurality of cargo loss-related conditions, wherein one of the two or more cargo loss-related conditions includes movement of a cargo across a boundary line inside the trailer; and
  - transmit a lost cargo detection signal to an external receiver,
  - wherein determining the cargo loss event has occurred is based on a sequence of the two or more cargo loss-related conditions.

20. The vehicle of claim 19, wherein:
- the plurality of sensors includes one or more magnetic sensors, one or more electrical contact sensors, one or more infrared sensors, one or more cameras, one or more proximity sensors, one or more presence detection sensors, one or more location sensors, or one or more light sensors; and
- the plurality of cargo-loss related conditions includes longitudinal movement of the cargo inside the trailer, open or close trailer doors, or presence or absence of the cargo.

* * * * *